United States Patent [19]

Lubbock et al.

[11] 4,447,475

[45] May 8, 1984

[54] PROCESS FOR COMPOSITE POLYMER BEADS

[75] Inventors: Frederick J. Lubbock, Beaumaris; Christopher C. K. Mok, Clayton; Robert J. Eldridge, Moorabbin, all of Australia

[73] Assignees: ICI Australia Limited, Victoria; Commonwealth Scientific and Industries Reserach Organization, Campbell, both of Australia

[21] Appl. No.: 220,024

[22] PCT Filed: Jun. 2, 1980

[86] PCT No.: PCT/AU80/00018

§ 371 Date: Dec. 3, 1980

§ 102(e) Date: Dec. 3, 1980

[87] PCT Pub. No.: WO80/02687

PCT Pub. Date: Dec. 11, 1980

[51] Int. Cl.$^3$ .......................... B01J 13/02; B05D 7/16
[52] U.S. Cl. .......................... 427/213.31; 252/62.54; 427/213.34; 428/402; 428/900; 524/459
[58] Field of Search .......................... 252/316, 62.54; 427/213.31, 213.34; 524/459

[56] References Cited

U.S. PATENT DOCUMENTS

| 3,884,871 | 5/1975 | Herman et al. | 427/221 X |
| 4,133,774 | 1/1979 | Brynko et al. | 252/62.54 X |
| 4,211,664 | 7/1980 | Dixon et al. | 252/62.54 |

FOREIGN PATENT DOCUMENTS

| 439432 | 5/1971 | Australia | 252/316 |
| 493973 | 11/1976 | Australia | 252/316 |
| 1407257 | 9/1975 | United Kingdom | 252/426 |

*Primary Examiner*—Richard D. Lovering
*Attorney, Agent, or Firm*—Cushman, Darby & Cushman

[57] ABSTRACT

A process of incorporating non-polymeric particulate matter such as magnetic materials, pigments and minerals, into a cross-linked styrene-based polymeric matrix, which process comprises dispersing the non-polymeric particles with a polymeric dispersant in a medium containing one or more vinyl monomers and a crosslinking agent, and adding a polymerization initiator. Typical polymeric dispersants are copolymers, styrenes and tertiary-nitrogen-containing vinyl monomers. Non-polymeric particulate matter incorporated into polymeric beads by this process is resistant to chemical attack and the beads may be used to prepare composite adsorbents or ion exchange resins.

10 Claims, No Drawings

PROCESS FOR COMPOSITE POLYMER BEADS

TECHNICAL FIELD

This invention relates to polymeric composites which are useful for the separation of small quantities of material from solution. In particular it relates to processes for the manufacture of polymeric material containing non-polymeric particulate matter.

The incorporation of particulate matter, such as for example magnetic particles, into polymeric resin beads to facilitate the handling and uses of these resins in ion exchange processes is well known. The particle-containing resins utilize the discovery that when finely divided ferromagnetic-containing ion exchange adsorbents are flocculated by magnetic forces of a suitable strength and agitated in the liquid to be treated, they still exhibit the high rates of adsorption appropriate to the original resin bead size but have the mechanical characteristics normally associated with larger resin beads. In another application ferromagnetic-containing resin beads may be used in mixed beds with other non-ferromagnetic beads and conveniently separated as desired, by the application of a magnetic field.

In addition to these ion exchange resin applications, magnetic particles have also been incorporated in composite adsorbents containing common adsorbing materials such as activated carbon which is used extensively throughout the chemical and process industries. It is typically used in the form of carbon black, graphite, or charcoals. Other materials with suitable adsorbing properties are the various naturally-occurring clays, for example, fuller's earth, and other mineral powders. Examples of the latter include quartz, silica gel, titanium dioxide, bauxite, zeolite and many metallic oxides.

In this approach the composite adsorbent material typically comprises adsorbent particles and magnetic particles embedded in a porous matrix of organic polymeric material, the porosity of the matrix being such as to allow small molecules of molecular weight up to several hundred to enter freely into the interstitial structure of the matrix but to exclude large molecules of higher molecular weight whereby the composite material functions selectively to adsorb dissolved materials from solution. The inclusion of magnetic particles enables the composite adsorbents to be easily and rapidly separated from the solutions being treated even when those solutions contain other suspended particulate matter.

BACKGROUND ART

Conventional ion-exchange resins and composite adsorbents have suffered from a number of disadvantages.

First, there has been the risk of interaction between the magnetic particles and the components of the system in which the ion exchange resins or composite adsorbents have been employed. This is a particularly serious problem with the porous composite adsorbents referred to above. Many of the common magnetic materials, such as ferrites, cannot be readily used at a pH below 7 and are rapidly degraded at a low pH.

Secondly, it has been very difficult to avoid "flushing" of the particulate matter during the preparation of the resin or composite adsorbent bead. "Flushing" refers to the tendency of the particle to leave the polymer during the formation of the bead. The particles frequently are competely excluded from the forming bead or concentrate and protrude from the outer surfaces of the bead. Where attempts have been made to encapsulate magnetic particles in a protective coating prior to incorporation in a resin or composite adsorbent, flushing has also been a problem.

A further problem relates to the processes of manufacturing ion exchange resins. Frequently it is desired to prepare polymeric beads and by subsequent reaction schemes to introduce onto these beads functional groups which will provide the desired ion exchange function. When magnetic particles are incorporated into the beads the range of possible subsequent chemical reactions of the polymeric bead matrix can be severely limited by the susceptibility of the magnetic material to attack. For example, for the important class of cross-linked styrene based resins key processes such as chloromethylation and sulphonation with chlorosulphonic acid or oleum cannot be used.

DISCLOSURE OF INVENTION

It is an object of our invention to provide a process of preparing polymeric beads containing particulate matter such as magnetic material, and which do not suffer from the disadvantages described above.

Accordingly we provide a process of incorporating non-polymeric particulate matter into a polymeric matrix, which process comprises dispersing the non-polymeric particulate matter by a polymeric dispersant in a medium containing one or more vinyl monomers and a cross-linking agent, and adding a polymerization initiator.

The nature of the polymeric dispersant and of the vinyl monomers is critical. Many dispersants and monomers are unsuitable and lead either to a porous polymeric matrix through which reagents may diffuse to attack the non-polymeric particulate matter, or to flushing of the non-polymeric particles from the forming polymer leaving the particles unprotected.

The polymer dispersants used in the process of our invention are copolymers prepared from two or more vinyl monomers. At least one monomer is selected from vinyl aromatic hydrocarbons, such as styrene and the vinyltoluenes. This monomer or groups of monomers forms the major component of the copolymer and is preferably from 80 to 97% of the copolymer on a molar basis.

At least one monomer is selected from the group consisting of tertiary-nitrogen-containing vinyl monomers and vinyl oxysilanes. Typical examples of this group of monomers are 2-vinylpyridine, 4-vinylpyridine, methyl dimethylaminomethacrylate, vinyltrimethoxysilane, and vinyltriethoxysilane. Monomers chosen from this group preferably comprise 20 to 3% of the copolymer on a molar basis.

The most preferred copolymers are styrene/4-vinylpyridine, styrene/2-vinylpyridine and styrene/vinyltriethoxysilane. The molecular weight range of the preferred copolymer is 10,000 to 30,000.

The vinyl monomers used to prepare the polymeric matrix are vinyltoluenes and styrene, optionally substituted. Substituted styrenes may include, for example, polyfluorostyrene but the preferred monomer is styrene. Two or more of these monomers may be used in combination.

Suitable crosslinking agents for the preparation of polymers from these monomers can be selected by those skilled in the art. Typical crosslinking agents are divinylbenzene, unsaturated polyesters, and triallyloxyethane. Divinylbenzene is the preferred crosslinking agent when the vinyl monomer is styrene.

Generally a catalyst is added with the crosslinking agent to promote the crosslinking. Appropriate catalysts are well known to those skilled in the art, for example in the case of divinylbenzene crosslinking agent, benzoyl peroxide may be employed.

In the process of our invention the polymeric dispersant is used to disperse the non-polymeric particulate matter in a media containing the vinyl monomers and the crosslinking agent. On addition of the catalyst the vinyl monomers polymerize and form a matrix enclosing the non-polymeric particles. By adjusting the speed of stirring and the properties of reagents it is possible to produce particles coated with a thin protecting layer of polymer or composites of several particles embedded in a polymer matrix bead.

A wide range of non-polymeric particles may be incorporated in polymeric matrixes by the process of our invention, for example, magnetic materials, inorganic oxides and silicates, minerals and pigments. While some of these materials, for example, titanium dioxide, have previously been incorporated into polymeric matrixes by conventional dispersants it is a particular feature of the process of our invention that a wide range of magnetic materials can be readily and effectively incorporated into polymers.

Furthermore the nature of the magnetic material that can be incorporated by the process of our invention is not narrowly critical. Typical magnetic materials are iron and alloys of iron and metals such as for example, cobalt, nickel, manganese, molybdenum, and aluminium, iron-silicon alloys, magnetic ceramics and ferrites. Suitable ferrites include the naturally occurring magnetite ($Fe_3O_4$), maghemite ($\gamma$-$Fe_2O_3$), jacobsite, franklinite, magnesioferrite, and magnetoplumbite. Chromium dioxides may also be used.

In a preferred embodiment of our process the non-polymeric particles are pre-coated with the polymeric dispersant prior to formation of the cross-linked polymeric coating.

BEST MODE OF CARRYING OUT THE INVENTION

The weight ratio of the polymer forming components to the non-polymeric particulate matter is adjusted to avoid too high a proportion of non-polymeric particles leading to incomplete covering of the non-polymeric materials, or too low a proportion for the particular application, e.g., too little magnetism where magnetic particles are being incorporated. High levels of the non-polymer particles can also lead to a thick paste where the non-polymeric particles are difficult to disperse.

Preferably the weight ratio of non-polymeric particles to the polymeric dispersant is in a range from 12:1 to 5:1 while the weight ratio of polymeric dispersant to monomers is in a range from 1:5 to 1:20. When the process is used to encapsulate individual magnetic particles in a protective coating prior to incorporation of the protected magnetic particles into ion exchange resins or composite adsorbents, the weight ratio of magnetic particles to polymer coating is preferably close to unity.

In the embodiment where the non-polymeric particles are coated with polymeric dispersant in a preliminary step before the main polymerization step, this dispersant is conveniently that used in the subsequent polymerization step. This pre-coating of the particles with polymeric dispersant is more effective if heat is applied, for example by refluxing the non-polymeric particles in a solution of the dispersant in a solvent inert to the particles such as xylene. After refluxing the solvent is removed by evaporation. For this pre-coating step the weight ratio of polymeric dispersant to particles may be in the range of 5:1 to 30:1, preferably in the range of 8:1 to 16:1.

In a preferred embodiment of our process the polymerization is carried out with an organic phase containing the monomers and an aqueous phase containing a suspension stabilizer, such as polyvinylalcohol. It is important to wash the coated particles after the polymerization step to remove this stabilizer and thus avoid difficulties in the subsequent incorporation of the coated particles into ion exchange resins and composite adsorbents.

The weight ratio of organic phase to aqueous phase is typically in the range from 1:5 to 1:20, preferably in the range of 1:10 to 1:16. The size of the coated particles is influenced by the apparent viscosity of the aqueous phase. Viscosity is largely determined by concentration and for polyvinylalcohol a useful concentration range is 4.5–5.5% w/w, with the addition of 10–40% w/w calcium chloride. Coated particles in the size range from 1 to 1,000 $\mu$m can readily be prepared, the larger size requiring a calcium chloride concentration near 10%.

The preferred size is determined by the application to which the coated particles are put. Composite adsorbents, for example, are typically beads of approximate diameter 200–300 $\mu$m, and the size of coated magnetic particles incorporated into such adsorbents must be such as to allow adequate packing into the beads. The desired coated magnetic particle size is therefore 1–15 $\mu$m and this can be achieved in the above organic phase/aqueous phase embodiment of our process when about 30% w/w calcium chloride is used. If the magnetic material is initially of a larger particle size, it may be milled in the polymerization medium prior to the addition of the polymerization catalyst or initiator. This milling is also advantageous in ensuring that the individual particles are thoroughly wetted with dispersant.

Polymer bead size is influenced by the viscosity of the aqueous phase, the stirring speed, and the time of stirring. Optimum conditions can be readily determined for particular magnetic materials and polymers by those skilled in the art. The choice of temperature is to some extent influenced by the nature of the catalyst initiators used, for example, 70°–80° C. with benzoyl peroxide, and 65°–70° C. with azo-bis-butyronitrile.

INDUSTRIAL APPLICABILITY

One of the applications of the process of our invention is the preparation of coated ferromagnetic particles and composite adsorbents containing said particles, wherein the ferromagnetic particles are resistant to attack by components of the system being treated with the composite adsorbents. There are some acid-resistant magnetic materials available, for example the "Metglas" amorphous alloys ("Metglas" is a trademark of Allied Chemical Company, New Jersey), but none of these have the high magnetic permeability required for particles incorporated into composite adsorbents.

The preferred magnetic materials for this application are the ferrites, and particularly magnetite and maghemite. These materials are less dense than the alloys and are readily dispersed in the polymerization medium.

They are also easily milled, for example, in the embodiment of our invention where the particles are milled in the polymerization medium prior to the addition of the polymerization initiator.

Ferromagnetic particles prepared by the process of our invention are stable in the pH range from 14 to 2. In contrast to unprotected magnetic material they can be readily used in aqueous solutions of acids, such as acetic acid. Even below pH 2 some protection is provided.

A further application for the coated magnetic particles prepared by the process of our invention is in the preparation of composite magnetic ion exchange resins. Beads comprising the cross-linked styrene polymer of our process can be converted to resins by processes such as chloromethylation and sulphonation with chlorosulphonic acid or oleum without significant attack on the magnetic particles incorporated into the beads. There has previously been no satisfactory process for such composite resins.

Other particulate matter may be incorporated into the polymer beads of our invention in addition to magnetic particles. For example, there may be added weighting agents such as zircon and other minerals, pigments, and fillers of various types.

The invention is now illustrated by, but not limited to, the following examples:

EXAMPLE 1

Preparation of polymeric dispersant

A mixture of styrene (90 g), 4-vinylpyridine (10 g), and benzoyl peroxide (1.27 g) was added dropwise to toluene (100 ml; nitrogen purged) over 3 hours at 100° C. The solution was then refluxed for 4–5 hours until a golden-coloured copolymer was obtained. The copolymer is stable to air but will thicken if left standing for longer periods.

EXAMPLE 2

The procedure of Example 1 was repeated except that the quantity of 4-vinylpyridine was 20 g.

EXAMPLE 3

The procedure of Example 1 was repeated except that the quantity of styrene was 100 g and the 4-vinylpyridine was replaced by an equal weight of vinyltrimethoxysilane.

EXAMPLE 4

Pre-coating of magnetic particles

A sample of Bayer S11 $\gamma$-$Fe_2O_3$ was coated with the styrene/4-vinylpyridine copolymer of Example 1 by refluxing the sample in xylene with 6.25% of its weight of copolymer. The xylene was then removed by distillation.

EXAMPLES 5 AND 6

The procedure of Example 4 was repeated using, respectively, the copolymers of Examples 2 and 3.

EXAMPLE 7

Preparation of coated magnetic particles

A mixture of the pre-treated $\gamma$-$Fe_2O_3$ (52 g) of Example 4, styrene (52 g), divinylbenzene (10 g), and the styrene/4-vinylpyridine copolymer (10 g) of Example 1 was glass-ball milled for about 6 hours at ambient temperature. Benzoyl peroxide (1.0 g) was then added and the milling continued for 1 hour. The mixture was decanted from the glass balls and added to an aqueous suspension containing polyvinyl alcohol (500 g of 10.76% solution) dissolved in calcium chloride solution (600 mls; 40% aqueous solution).

The mixture was dispersed by vigorous stirring at 1500 rpm for about 15–20 minutes. At this stage the desired particle size (2–15 m) had been achieved and the stirring speed was reduced to 300 rpm. The temperature was raised to 80° C. to complete the styrene/divinylbenzene polymerization (approximately 16 hours).

The suspension was then diluted with hot water and the coated particles were separated from the polyvinyl alcohol solution by centrifugation, followed by several successive hot-water washings and centrifugations to remove adhering solution. The coated particles were finally washed with ethanol and acetone and recovered by filtration.

EXAMPLES 8 AND 9

The procedure of Example 7 was repeated using, respectively, the coated particles of Examples 5 and 6, and in each case the polymeric dispersant was that previously used to pre-coat the particles. If the polymeric dispersant was omitted during this coating procedure, some of the magnetic particles were "flushed" from the polymerizing beads and remained partly or completely uncoated and unprotected after the polymerization reaction was complete.

EXAMPLE 10

The coated particles of Example 7 were suspended in glacial acetic acid and the weight loss measured at various time intervals to determine the extent of attack on the magnetic material by the acid medium. The results are tabled below together with data from a comparison experiment with a sample of the magnetic material that had not been given a protected coating.

| Sample | Loss of $Fe_2O_3$ (% w/w) Days | | | | | |
| --- | --- | --- | --- | --- | --- | --- |
| | 1 | 6 | 14 | 22 | 30 | 82 |
| Unprotected $\gamma$-$Fe_2O_3$ | 0.27 | 0.45 | 0.64 | 0.93 | 1.0 | 1.8 |
| Protected $\gamma$-$Fe_2O_3$ (Example 7) | 0.11 | 0.12 | 0.14 | 0.16 | 0.30 | 0.29 |

Similar protection against attack by acetic acid was found with the protected particles of Examples 8 and 9.

EXAMPLE 11

Preparation of beads comprising $\gamma$-ferric oxide

A mixture of the pre-treated $\gamma$-$Fe_2O_3$ (47 g) of Example 4, styrene (69.6 g), divinylbenzene (9.4 g), and the styrene/4-vinylpyridine copolymer (4.0 g) of Example 1 was glass-ball milled for about 4½ hours at ambient temperature. Benzoyl peroxide (1.0 g) was then added and the milling continued for 1 hour. The mixture was decanted from the glass balls and added to an aqueous suspension containing polyvinyl alcohol (400 g of 10.76% solution) dissolved in calcium chloride solution (600 mls; 23.0 aqueous solution).

The mixture was dispersed by vigorous stirring at 250 rpm for about 15–20 minutes. At this stage the desired bead size 50–500 μm) had been achieved and the stirring speed was reduced to 100 rpm. The temperature was raised to 80° C. to complete the styrene/divinylbenzene polymerization (approximately 16 hours).

The suspension was then diluted with hot water and the coated beads were separated from the polyvinyl alcohol solution by sieves, followed by several successive hot-water washings. The coated beads were finally washed with ethanol and acetone and recovered by filtration.

EXAMPLE 12

Preparation of beads comprising chromium dioxide

Styrene-4-vinylpyridine copolymer (12.6 g) was dissolved into styrene (111 g) and divinylbenzene (7.80 g) monomers. To the monomer mixture was added $CrO_2$ (60 g) and the composite was glass-ball milled for 6 hours. Benzoyl peroxide (1.0 g), as an initiator was added to the mixture and further milled for 1 hour. The glass beads were then separated by filtering the monomer content through a coarse sieve. The filtrate was dispersed into a previously prepared aqueous suspension containing polyvinyl alcohol (PVA) (600 g, of 10.76% solution) dissolved in 900 ml of a 30% calcium chloride solution.

The composite was dispersed at 200 rpm until the desired bead size of 150–200 μm was obtained. The stirrer speed was then reduced to 100 rpm and the aqueous suspension was heated to 77°–80° C. (internal) or 90° (external temperature) to initiate the polymerization.

The suspension was diluted with some hot water and the $CrO_2$ beads were collected by pouring the content through a very fine sieve (usually 100 μm sieve) and washing the beads with copious amounts of warm water to remove any residual PVA on the beads. They were then transferred to a large sintered funnel and further washed with ethanol and with acetone.

EXAMPLE 13

Preparation of beads comprising zircon/chromium dioxide (1:1)

Styrene-4-vinylpyridine copolymer (48.7 g) was dissolved into styrene (333 g) and divinylbenzene (23.6 g) monomers. To the monomer mixture was added $CrO_2$ (130 g) and $ZrSiO_4$ (130 g) and the composite was glass-ball milled for 6½ hours. Benzoyl peroxide (3.0 g), as an initiator was added and milled into the mixture for another 1 hr. The glass beads were then separated from the monomer mixture by filtration using a coarse sieve. The filtrate was dispersed into a previously prepared aqueous suspension containing PVA (2 000 g, of an 8.75% solution) dissolved in 2 500 g of a 21.6% calcium chloride solution.

The composite was dispersed at 250 rpm until the desired bead size of 250–700 μm was obtained. The stirrer speed was then reduced to 100 rpm and the aqueous suspension heated to 77°–80° C. (int) or 90° C. (ext) to initiate the polymerization.

Fairly firm beads were obtained after 2 hours, but left for 16 hours to complete the polymerization. The aqueous suspension was diluted with some hot water and the $CrO_2ZrSiO_4$ beads were filtered through a fine sieve (100 μm sieve) and the collected beads washed with copious amounts of warm water to remove residual PVA adhering on the beads. The beads were then transferred to a large sintered funnel and further washed with ethanol and then with acetone.

We claim:

1. A process of incorporating non-polymeric magnetic particulate matter into a polymeric matrix so as to obtain composite particles or beads comprising the non-polymeric magnetic particulate matter coated or embedded in said matrix, said process comprising the steps of polymerizing while stirring a mixture of (1) a dispersion of the non-polymeric magnetic particulate matter in a medium comprising one or more vinyl monomers selected from the group consisting of styrene, substituted styrenes and vinyltoluenes, a polymeric dispersant selected from the group of copolymers consisting of styrene/2-vinylpyridine, styrene/4-vinylpyridine, styrene/vinyltrimethoxysilane and styrene/vinyltriethoxysilane, a cross-linking agent and a polymerization initiator, and (2) an aqueous phase containing a suspension stabilizer, to obtain said composite particles or beads and then separating said particles or beads from the polymerization medium; the weight ratio of non-polymeric magnetic particulate matter to the polymeric dispersant being in a range from 12:1 to 5:1; and the weight ratio of polymeric dispersant to vinyl monomers being in a range from 1:5 to 1:20.

2. A process according to claim 1 wherein the magnetic particulate matter is selected from the group consisting of ferrites and chromium dioxide.

3. A process according to claim 3 wherein zircon particles are also used with the non-polymeric magnetic particulate matter.

4. A process according to claim 3 wherein the non-polymeric magnetic particulate matter comprises γ-iron oxide.

5. A process according to claim 1 wherein the copolymer contains from 80 to 97% w/w of styrene.

6. A process according to claim 1 wherein the cross-linking agent is divinylbenzene.

7. A process according to claim 1 wherein the non-polymeric magnetic particulate matter is coated with polymeric dispersant prior to the addition of vinyl monomers and crosslinking agent.

8. A process according to claim 1 wherein the suspension stabilizer is polyvinyl alcohol.

9. A process according to claim 8 wherein the weight ratio of organic phase is in a range from 1:5 to 1:20.

10. A process according to claim 9 wherein the weight ratio of organic phase to aqueous phase is in a range from 1:10 to 1:16.

* * * * *